United States Patent
Hasegawa et al.

(10) Patent No.: US 9,486,875 B2
(45) Date of Patent: Nov. 8, 2016

(54) ONE-SIDE SPOT WELDING METHOD AND ONE-SIDE SPOT WELDING APPARATUS

(75) Inventors: Eisaku Hasegawa, Tochigi (JP); Sumitomo Watanabe, Tochigi (JP); Masahito Mutou, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 13/602,401

(22) Filed: Sep. 4, 2012

(65) Prior Publication Data

US 2013/0056451 A1 Mar. 7, 2013

(30) Foreign Application Priority Data

Sep. 5, 2011 (JP) .................................. 2011-193394
Nov. 25, 2011 (JP) .................................. 2011-257004

(51) Int. Cl.
| | | |
|---|---|---|
| *B23K 9/00* | (2006.01) | |
| *B23K 11/11* | (2006.01) | |
| *B23K 11/00* | (2006.01) | |
| *B23K 11/36* | (2006.01) | |

(52) U.S. Cl.
CPC ............ *B23K 11/11* (2013.01); *B23K 11/0026* (2013.01); *B23K 11/364* (2013.01)

(58) Field of Classification Search
CPC ... B23K 11/11; B23K 11/0026; B23K 11/10; B23K 11/364; B23K 9/00
USPC ............... 219/117.1, 86.9, 86.22, 91.2, 127
See application file for complete search history.

(56) References Cited

U.S. PATENT DOCUMENTS

| | | | | |
|---|---|---|---|---|
| 2,232,450 A | * | 2/1941 | Hagedorn | ...................... 219/86.1 |
| 3,045,103 A | * | 7/1962 | Warner | ................ B23K 11/002 |
| | | | | 219/86.41 |
| 3,562,054 A | * | 2/1971 | Wolf | ....................... B29C 63/02 |
| | | | | 156/274.4 |
| 4,910,376 A | | 3/1990 | Riley et al. | |
| 6,459,064 B1 | | 10/2002 | Trubert | |
| 6,806,436 B2 | * | 10/2004 | Katou et al. | .................. 219/86.9 |

(Continued)

FOREIGN PATENT DOCUMENTS

| | | |
|---|---|---|
| JP | 11-333569 | 12/1999 |
| JP | 2005-334971 | 12/2005 |

(Continued)

OTHER PUBLICATIONS

Resistance Welding Method, Fukuda et al., total 11 pages, Feb. 17, 2011, published by JPO.*

(Continued)

*Primary Examiner* — Dana Ross
*Assistant Examiner* — Kuangyue Chen
(74) *Attorney, Agent, or Firm* — Rankin, Hill & Clark LLP

(57) ABSTRACT

A one-side spot welding method for causing an electrode to contact a welding portion of a work-piece only from one side of the work-piece to weld the work-piece, the method includes a nugget forming process of applying welding pressure to the work-piece through the electrode, and causing the work-piece to be fully electrically conducted at a predetermined current value, and a slow-cooling process of applying welding pressure to the work-piece through the electrode from the one side, and causing the work-piece to be electrically conducted at a current value lower than the predetermined current value after the nugget forming process.

2 Claims, 7 Drawing Sheets

(56) References Cited

U.S. PATENT DOCUMENTS

| | | | |
|---|---|---|---|
| 8,334,474 B1* | 12/2012 | Oatridge et al. | 219/86.9 |
| 2008/0190899 A1* | 8/2008 | Sugahara et al. | 219/86.25 |
| 2011/0272384 A1* | 11/2011 | Matsushita et al. | 219/91.2 |
| 2012/0067851 A1* | 3/2012 | Lee | 219/86.9 |

FOREIGN PATENT DOCUMENTS

| | | | |
|---|---|---|---|
| JP | 2008-55437 | | 3/2008 |
| JP | 2009-241136 | | 10/2009 |
| JP | 2010-90440 | | 4/2010 |
| JP | 2011-31266 | | 2/2011 |
| JP | 2011-031271 | | 2/2011 |
| JP | 2011031271 A | * | 2/2011 |
| JP | 2011-50977 | | 3/2011 |
| KR | 10-0847595 | | 7/2008 |

OTHER PUBLICATIONS

Chinese Office Action dated Jun. 24, 2014, 9 pages.
Japanese Office Action dated Dec. 2, 2014, Application No. 2011-257004, 4 pages.

* cited by examiner

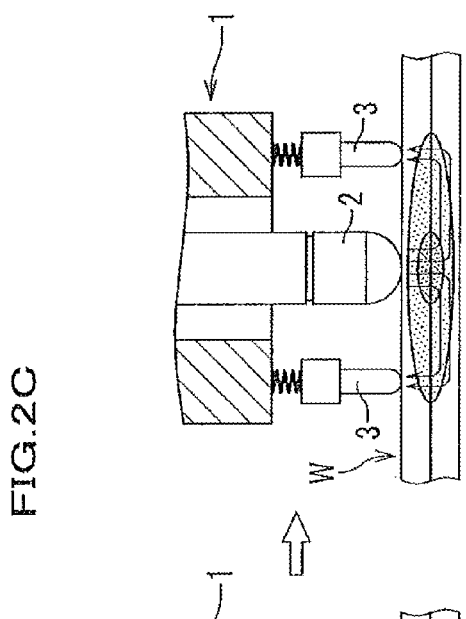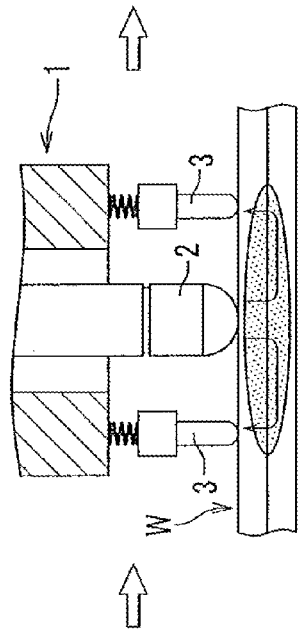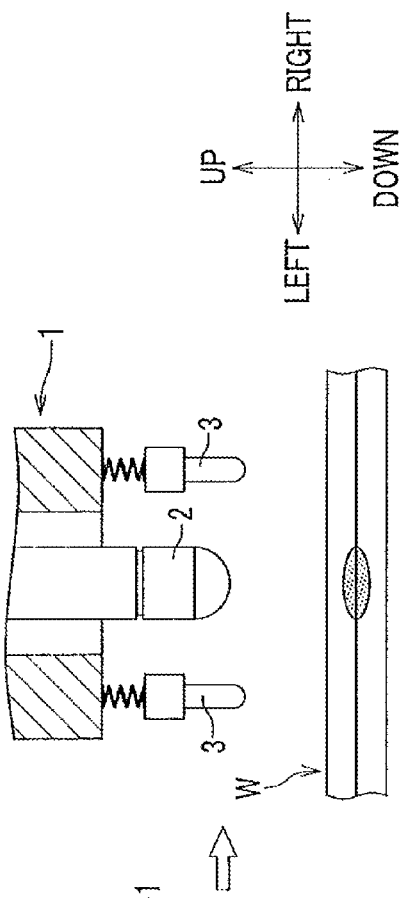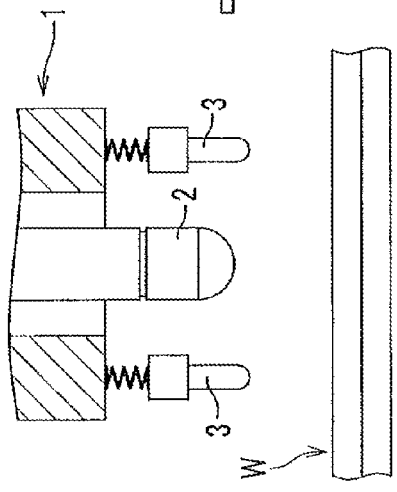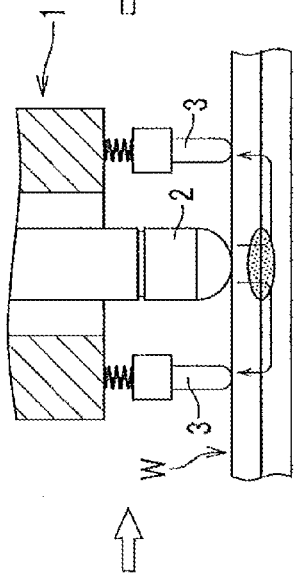

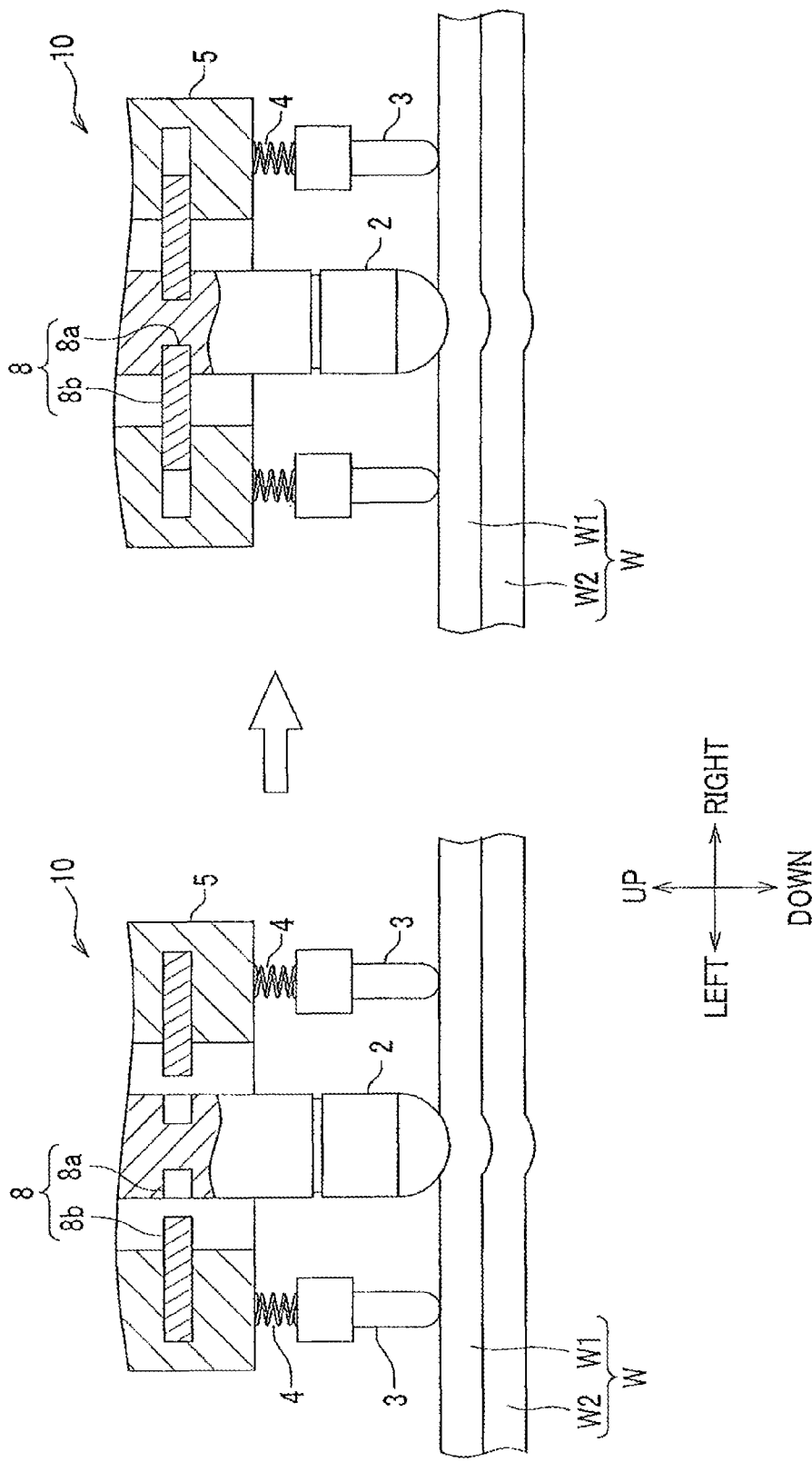

ONE-SIDE SPOT WELDING METHOD AND ONE-SIDE SPOT WELDING APPARATUS

BACKGROUND OF THE INVENTION

1. Field of the Invention

The present invention relates to a one-side spot welding method and a one-side spot welding apparatus that perform welding by causing an electrode to contact a welding portion of work-pieces only from the one side thereof.

2. Description of the Related Art

When joining a plurality of work-pieces (sheet metals, etc., in a tabular shape), a spot welding technique is applied which allows a current to flow through the work-pieces while applying welding pressure to such work-pieces, and which causes metals to be melted by resistive heat generated by the current flow and the pressurization, thereby welding the work-pieces together.

This spot welding is classified into various kinds depending on the differences of the way of causing the welding current to flow, but roughly classified into two kinds; a both-side spot welding which allows a current to flow through the work-pieces while applying pressure from both sides of the work-pieces; and a one-side spot welding which allows a current to flow through the work-pieces while applying pressure from only the one side of the work-pieces.

Since work-pieces are in various shapes, it is physically difficult in some cases to cause electrodes (welding guns) to abut the work-piece from both sides thereof when work-pieces in a complicated shape are a welding target. In this case, the one-side spot welding is inevitably applied.

As explained above, in comparison with the both-side spot welding, the one-side spot welding has a broad range of the welding targets to which the one-side spot welding is applicable. However, since application of pressure is possible only from the one side of the work-piece, it is difficult to apply sufficiently high pressure to the work-piece when joining the work-pieces together. Hence, in comparison with a case in which the work-pieces are joined together by both-side spot welding, gas pockets (gaps) are likely to be produced at the welded portion in joining of the work-pieces together. When the welded portion is solidified without removing the gases in the gas pockets, such gas pockets highly possibly become blow holes conclusively.

JP 2011-31271 A discloses a one-side spot welding technique that causes a welding electrode and a plurality of ground electrodes to abut a work-piece to let a current to flow across both kinds of electrodes.

According to this structure, a plurality of current paths between the welding electrode and the grounding electrodes are formed, and the current density at a portion of the work-piece where each electrode abuts can be dispersed. Accordingly, it becomes possible to prevent the current density from being concentrated at only one abutting location, and the work-piece can be softened entirely. As a result, the whole electrodes appropriately bite into the work-piece, thereby preventing a joining failure.

The technology disclosed in JP 2011-31271 A is, however, not a technology at all to eliminate the generation of the blow holes inherent to the characteristics (the difficulty of applying sufficiently high pressure to a work-piece) of the one-side spot welding, and cannot address the above-explained technical issue.

That is, the technology disclosed in JP 2011-31271 A can prevent a joining failure due to the unevenness of the current density, but cannot prevent a joining failure (the generation of blow holes) due to the insufficient pressure application.

It is an object of the present invention to provide a one-side spot welding method and a one-side spot welding apparatus which can suppress generation of blow holes.

SUMMARY OF THE INVENTION

To achieve the above object, a first aspect of the present invention provides a one-side spot welding method for causing an electrode to contact a welding portion of a work-piece only from one side of the work-piece to weld the work-piece, and the method includes: a nugget forming process of applying welding pressure to the work-piece through the electrode, and causing the work-piece to be fully electrically conducted at a predetermined current value; and a slow-cooling process of applying welding pressure to the work-piece through the electrode from the one side, and causing the work-piece to be electrically conducted at a current value lower than the predetermined current value after the nugget forming process.

According to this one-side spot welding method, first, the work-piece is fully electrically conducted while applying welding pressure thereto through the electrode in the nugget forming process to form a nugget (a melted portion) in a welding portion. Next, the work-piece is electrically conducted at a lower current value than the current value of the full electrical conduction while applying welding pressure to the work-piece through the electrode in the slow-cooling process, and thus the work-piece can be cooled slowly while the formed nugget is being pushed down. It becomes possible to prevent a formation of gas pocket at the welding portion through this process, thereby suppressing generation of blow holes.

It is preferable the one-side spot welding method of a second aspect of the present invention should further includes a pre-electrical-conduction process of applying welding pressure to the work-piece through the electrode from the one side and provisionally causing the work-piece to be electrically conducted at a current value lower than the predetermined current value.

According to this one-side spot welding method, pre-electrical conduction is carried out at a lower current value than that of the full electrical conduction while applying welding pressure to the work-piece through the electrode prior to the nugget forming process. Accordingly, the temperature of the work-piece is increased, the work-piece is softened, and thus a clearance between work-pieces and between the work-piece and the electrode are eliminated. As a result, a contacting condition between the work-pieces and a contacting condition between the work-piece and the electrode are improved. This facilitates formation of an appropriate nugget.

According to the one-side spot welding method of a third aspect of the present invention, it is preferable that the electrode should include a welding electrode and a grounding electrode, and welding pressure from the welding electrode to the work-piece in the slow-cooling process should be lower than welding pressure from the welding electrode to the work-piece in the nugget forming process.

According to this one-side spot welding method, the welding pressure from the welding electrode to the work-piece in the slow-cooling process is lowered than the welding pressure from the welding electrode to the work-piece in the nugget forming process. Hence, it becomes possible to avoid an occasion in which the welding electrode subducts into the work-piece made softened in the nugget forming process and the boundary face between the work-pieces is displaced so that the joining strength is reduced (which causes a joining failure).

A fourth aspect of the present invention provides a one-side spot welding apparatus that causes an electrode to contact a welding portion of a work-piece only from one side of the work-piece to weld the work-piece, and the apparatus includes: a welding gun that includes: a welding electrode that abuts the welding portion of the work-piece from the one side; and a grounding electrode that abuts the work-piece from the one side; a pressure mechanism that applies welding pressure to the work-piece through the welding electrode and the grounding electrode; and a control mechanism that controls a current to be flown between the welding electrode and the grounding electrode. The control mechanism is configured to cause the work-piece to be fully electrically conducted at a predetermined current value while causing the welding electrode and the grounding electrode to apply welding pressure to the work-piece, and then cause the work-piece to be electrically conducted at a current value lower than the predetermined current value while causing the welding electrode and the grounding electrode to apply welding pressure to the work-piece.

According to this one-side spot welding apparatus, first, the control mechanism causes the work-piece to be fully electrically conducted while applying welding pressure to the work-piece through the welding electrode and the grounding electrode to form a nugget in the welding portion. Next, the control mechanism causes the work-piece to be electrically conducted at a lower current value than that of the full electrical conduction while applying welding pressure to the work-piece through the welding electrode and the grounding electrode. Accordingly, the work-piece can be cooled slowly while the formed nugget is being pushed down, and thus it becomes possible to prevent generation of air pockets in the welding portion. As a result, it becomes possible to suppress generation of blow holes.

According to the one-side spot welding apparatus of a fifth aspect of the present invention, it is preferable that the control mechanism should provisionally cause the work-piece to be electrically conducted at a current value lower than the predetermined current value before the full electrical conduction while causing the welding electrode and the grounding electrode to apply welding pressure to the work-piece.

According to this one-side spot welding apparatus, the control mechanism performs pre-electrical conduction at a lower current value than that of the full electrical conduction while applying welding pressure to the work-piece through the welding electrode and the grounding electrode prior to the full electrical conduction. Accordingly, the temperature of the work-piece is increased and thus the work-piece is softened. Hence, a clearance between the work-pieces and a clearance between the work-piece and the electrode can be eliminated. As a result, a contacting condition between the work-pieces and a contacting condition between the work-piece and the electrode are improved. This facilitates formation of an appropriate nugget.

According to the one-side spot welding apparatus of a sixth aspect of the present invention, it is preferable that the number of grounding electrodes should be equal to or greater than two, and the plurality of grounding electrodes are placed so as to be symmetrical with respect to the welding electrode.

According to this one-side spot welding apparatus, the one-side spot welding apparatus includes the welding electrode and equal to or greater than two grounding electrodes provided so as to be symmetrical with respect to the welding electrode. Hence, there are plural electrical conduction routes between the welding electrode and the grounding electrodes, and the bias of the power density can be reduced as much as possible. Accordingly, a stable (non-biased) nugget can be formed in the welding portion of the work-piece.

It is preferable that the one-side spot welding apparatus should further include locking mechanism which interlocks the welding electrode or a welding-electrode supporting member that supports the welding electrode with the grounding electrode or a grounding-electrode supporting member that supports the grounding electrode in such a way that a position of a tip of the welding electrode is fixed with respect to a position of a tip of the grounding electrode, in which the control mechanism interlocks the welding electrode or the welding-electrode supporting member with the grounding electrode or the grounding-electrode supporting member through the locking mechanism before starting the electrical conduction at a lower current value than the predetermined current value after the full electrical conduction.

According to this one-side spot welding apparatus, the locking mechanism interlocks the welding electrode (or the welding-electrode supporting member) with the grounding electrode (or the grounding-electrode supporting member) when the control mechanism starts electrical conduction (when starting the slow-cooling process) at a lower current value than the predetermined current value after the full electrical conduction. Accordingly, the position of the tip of the welding electrode can be fixed with respect to the position of the tip of the grounding electrode. Since the portion of the work-piece where the grounding electrode abuts is not softened well, the grounding electrode does not largely subduct into the work-piece. That is, at the time of welding, the grounding electrode is fixed (positioned) with respect to the work-piece. As a result, after interlocked with the grounding electrode (or the grounding-electrode supporting member), the tip of the welding electrode does not subduct into the work-piece even if the work-piece is made softened. Therefore, according to this one-side spot welding apparatus, it becomes possible to avoid an occasion in which the boundary face between the work-piece is displaced and the joining strength is reduced (which causes a joining failure).

According to the one-side spot welding method and the one-side spot welding apparatus of the present invention, the full electrical conduction is carried out while applying welding pressure to the work-piece to form a nugget in the welding portion of the work-piece. Next, the work-piece is electrically conducted at a lower current value than that of the full electrical conduction while welding pressure is being applied to the work-piece. Accordingly, it becomes possible to prevent generation of air pockets in the welding portion, thereby suppressing generation of blow holes.

Moreover, according to the one-side spot welding method and the one-side spot welding apparatus of the present invention, the welding pressure from the welding electrode to the work-piece in the slow-cooling process is lowered than the welding pressure from the welding electrode to the work-piece in the nugget forming process. Accordingly, it becomes possible to avoid an occasion in which the electrode subducts into the softened work-piece, and the boundary face between the work-pieces is displaced so that the joining strength is reduced (which causes a joining failure).

BRIEF DESCRIPTION OF THE DRAWINGS

FIGS. 2A to 2E are cross-sectional views of a major part of the one-side spot welding apparatus according to the embodiment of the present invention, in which FIG. 2A is a major-part cross-sectional view showing a condition before starting welding, FIG. 2B is a major-part cross-sectional view showing a condition of a pre-electrical-conduction process after the welding is started, FIG. 2C is a major-part cross-sectional view showing a condition of a nugget forming process after the pre-electrical-conduction process, FIG. 2D is a major-part cross-sectional view showing a condition of a slow-cooling process after the nugget forming process, and FIG. 2E is a major-part cross-sectional view showing a condition after the welding completes;

FIGS. 5A and 5B are cross-sectional views of a major part of a one-side spot welding apparatus according to another embodiment of the present invention, in which FIG. 5A is a major-part cross-sectional view showing an unlocked condition by a locking mechanism, and FIG. 5B is a major-part cross-sectional view showing a locked condition by the locking mechanism;

FIGS. 6A and 6B are graphs showing a carried current, a welding pressure, and a welding-electrode displacement in welding carried out by the one-side spot welding apparatus according to another embodiment of the present invention, in which FIG. 6A is a graph when the welding pressure is constant and FIG. 6B is a graph when the welding pressure in the slow-cooling process is reduced.

DETAILED DESCRIPTION OF THE PREFERRED EMBODIMENTS

Embodiments to carry out the present invention will now be explained in detail with reference to the accompanying drawings.

In the following explanation, when expressing "up, down, left, and right", respective directions in each figure are taken as references.

<<General Configuration of One-Side Spot Welding Apparatus>>

A one-side spot welding apparatus 10 applies pressure to a work-piece W that is a welding target like sheet metal and allows a current to flow through the work-piece W from only one side thereof, thereby welding the work-piece W.

Figure 1:
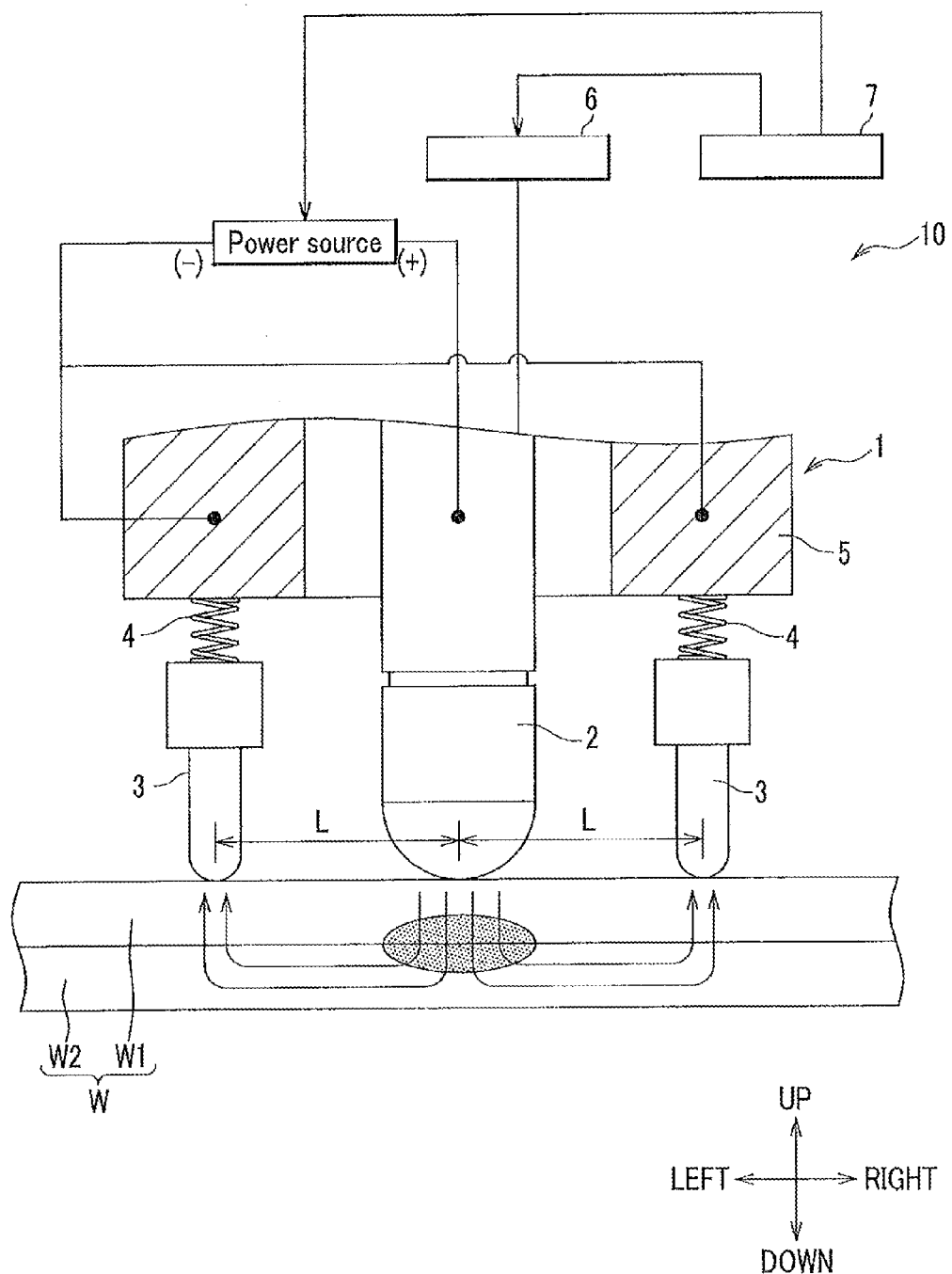
FIG. 1 is a cross-sectional view of a major part of a one-side spot welding apparatus according to an embodiment of the present invention.

As shown in FIG. 1, the one-side spot welding apparatus 10 includes a welding gun 1 having a welding electrode 2 that abuts a work-piece W1 from the upper part thereof, and grounding electrodes 3, 3 which abut the work-piece W1 from the upper part thereof and which are provided one by one at the right and left of the welding electrode 2. The one-side spot welding apparatus 10 further includes a pressure mechanism 6 that moves the welding gun 1 to apply pressure to the work W through the welding gun 1, and a control mechanism 7 that controls a current to be caused to flow across the welding gun 1.

As shown in FIG. 5, in the horizontal direction (the direction perpendicular to a direction in which welding pressure is applied to the work-piece W), the one-side spot welding apparatus 10 may further include locking mechanism 8 (8a, 8b) that couple a grounding-electrode supporting member 5 that supports the grounding electrodes 3, 3 with the welding electrode 2.

Respective components of the one-side spot welding apparatus 10 will be explained below.

<Welding Gun>

The welding gun 1 includes electrodes (the welding electrode 2 and the grounding electrodes 3, 3), and causes the work-piece W to be electrically conducted while depressing the electrodes against the work W, thereby welding the work-piece W.

As shown in FIG. 1, the welding gun 1 includes the welding electrode 2 formed in a substantially bar shape and provided along the vertical direction, and the two grounding electrodes 3, 3 each formed in a substantially bar shape and provided along the vertical direction. The two grounding electrodes 3, 3 are placed so as to be symmetrical with respect to the welding electrode 2, and are disposed at right and left locations, respectively, distant from the welding electrode 2 by the same distance (L).

Note that the description "placed so as to be symmetrical with respect to the welding electrode 2" means, in other words, the grounding electrodes are disposed at an equal interval over a circumference of a circle around the welding electrode 2.

The grounding electrodes 3, 3 are supported by the grounding-electrode supporting member 5 via respective springs 4 and 4, and the grounding-electrode supporting member 5 and the welding electrode 2 are directly or indirectly coupled with each other through several components.

The welding electrode 2 is connected to a positive electrode (+) of a power supply, and the grounding electrodes 3, 3 are connected to a negative electrode (−) of the power supply. According to such a connection of the power supply, as shown in FIG. 1, a current flows from the welding electrode 2 to the grounding electrodes 3, 3 through work-pieces W1 and W2.

<Pressure Mechanism>

The pressure mechanism 6 gives pressure to the work-piece W through the welding electrode 2 of the welding gun 1 and the grounding electrodes 3, 3 thereof.

More specifically, the pressure mechanism 6 moves the welding gun 1, and moves the welding gun 1 in the direction in which the work-piece W is placed (the downward direction), thereby giving pressure to the work-piece W through respective tips of the welding electrode 2 of the welding gun 1 and the grounding electrodes 3, 3 thereof.

The pressure mechanism 6 is not limited to any particular one as long as it can move the welding gun 1 at least in the vertical direction, and may be mechanisms, such as a hydraulic cylinder movable in the vertical direction and an ascending/descending device like a servo motor. Moreover, the pressure mechanism 6 employs a configuration provided outside the welding gun 1, but may employ a configuration provided inside the welding gun 1 and moving only the welding electrode 2 of the welding gun 1 and the grounding electrodes 3, 3 thereof in the vertical direction.

<Control Mechanism>

The control mechanism 7 controls a current caused to flow between the welding electrode 2 of the welding gun 1 and the grounding electrodes 3, 3. The control mechanism 7 also controls the pressure mechanism 6.

The control mechanism 7 is, for example, a computer including a CPU (Central Processing Unit), a ROM (Read Only Memory), a RAM (Random Access Memory), and HDD (Hard Disk Drive), and input/output interfaces, etc.

The detail of a control method of the one-side spot welding apparatus 10 (the current, the pressure mechanism 6, and the locking mechanism 8) by the control mechanism 7 will be discussed later.

<Locking Mechanism>

The locking mechanism 8 fixes the position of the tip of the welding electrode 2 in the vertical direction (the direction in which the work-piece W is pressed) with respect to respective positions of the tips of the grounding electrodes 3, 3.

More specifically, as shown in FIG. 5, the locking mechanism 8 includes a latching opening 8a provided in an outer circumference surface of the welding electrode 2, and latching members 8b which are provided at the inner circumference surface of the grounding-electrode supporting member 5 that supports the grounding electrodes 3, 3 from the upper space and at a location facing with the latching opening 8a, and each of which is formed in a bar shape that can be moved in the horizontal direction (the direction perpendicular to the direction in which the work-piece W is pressed) so as to be inserted in the latching opening 8a.

The movement of the latching members 8b in the horizontal direction can be carried out through any given mechanisms, such as a hydraulic cylinder (unillustrated).

In FIGS. 5A and 5B, the latching opening 8a is provided in the outer circumference surface of the welding electrode 2, but the position where such a latching opening is provided is not limited to the former location, and for example, the latching opening may be provided in a welding-electrode supporting member (unillustrated) that supports the welding electrode 2 from the upper space.

Moreover, the latching opening 8a of the locking mechanism 8 may be provided inside the grounding-electrode supporting member 5 (or the grounding electrodes 3, 3) and the latching members 8b may be provided at the welding electrode 2 (or the welding-electrode supporting member).

<<One-Side Spot Welding Method>>

Figure 4:
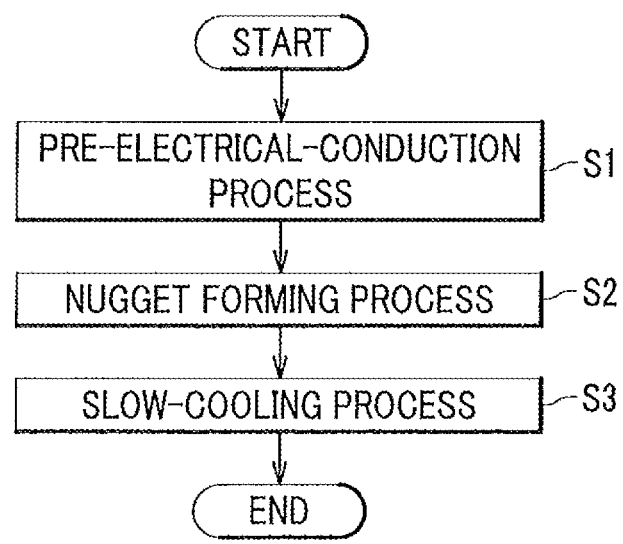
FIG. 4 is a flowchart showing a one-side spot welding method according to the embodiment of the present invention.

As shown in FIG. 4, the one-side spot welding method includes a pre-electrical-conduction process S1 for increasing the temperature of the work-piece W before forming a nugget, a nugget forming process S2 for forming a nugget in the work-piece W after the pre-electrical-conduction process S1, and a slow-cooling process S3 for slowly performing cooling while pushing down the nugget after the nugget forming process.

<Start of Pressure Application>

In performing welding, first of all, the welding electrode 2 of the welding gun 1 and the grounding electrodes 3, 3 thereof start applying pressure to the work-piece W. Such pressure application may be started upon inputting of a start signal into the control mechanism 7 before an operator starts welding, or may be started in accordance with a time table stored in the HDD, etc., of the control mechanism 7.

Next, when the applied pressure becomes stable, the pre-electrical-conduction process S1 is carried out.

<Pre-Electrical-Conduction Process>

The pre-electrical-conduction process S1 is carried out before the nugget forming process S2, and is to cause the work-piece W to be electrically conducted at a smaller current value than a current value of the full electrical conduction (a predetermined current value in the nugget forming process S2) while applying pressure to the work-piece W through the electrodes 2, 3, and 3.

Figure 3:
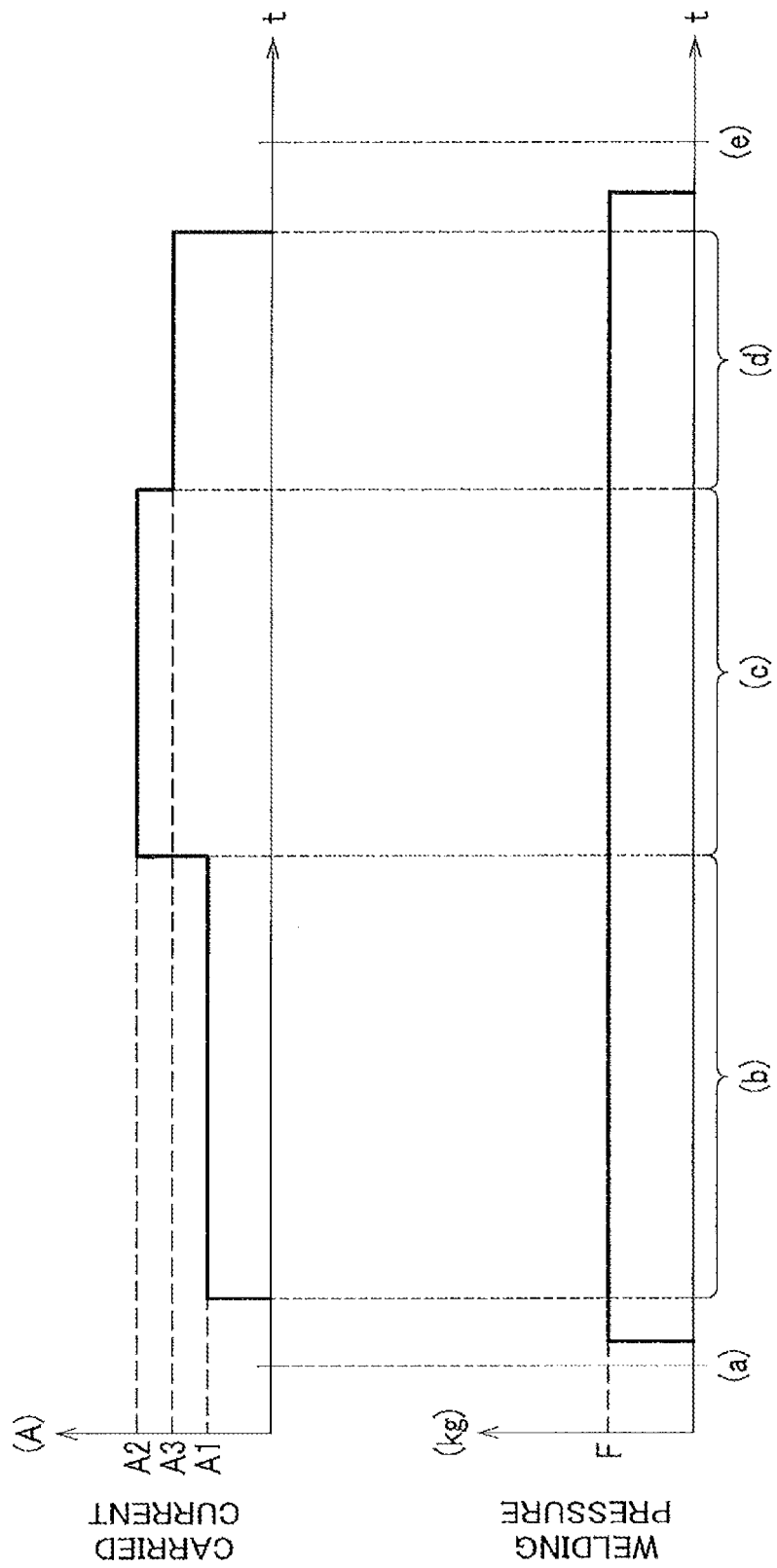
FIG. 3 is a graph showing a carried current and a welding pressure in welding carried out by the one-side spot welding apparatus according to the embodiment of the present invention (where symbols A to E corresponds to FIGS. 2A to 2E)

With reference to FIG. 3, the pre-electrical-conduction process S1 is indicated by an interval (b) where predetermined welding pressure F is applied to the work W and the work-piece W is electrically conducted at a current value A1 smaller than a current value A2 of the full electrical conduction.

The welding electrode 2 and the grounding electrodes 3, 3 generate heats, and the work-pieces W1, W2 are heated and softened through the pre-electrical-conduction process S1 (see FIG. 2B). When the work-pieces W1 and W2 are heated and the welding pressure is applied thereto through the welding electrode 2 and the grounding electrodes 3, 3, the welding electrode 2 becomes to fit the work-piece W1 well (a space therebetween is eliminated), and the grounding electrodes 3, 3 become to fit the work-piece W1 well (a space therebetween is eliminated). As a result, the contacting condition between the work-piece W1 and the work-piece W2 and the contacting condition between the work-piece W1 and the electrodes 2, 3, and 3 become appropriate. This facilitates formation of an appropriate nugget.

The welding pressure F is not limited to any particular one, but it is preferable if the welding pressure should be sufficiently high so as not to produce any splash or spark on the surface of the work-piece W1 or between the work-piece W1 and the work-piece W2, and should be sufficiently small so as not to downsize the nugget to be formed by high pressure.

Regarding the pre-electrical-conduction process S1, it is not a requisite process from the standpoint of preventing a formation of blow holes, but it is preferable that the one-side spot welding method should include the pre-electrical-conduction process to form an appropriate nugget.

<Nugget Forming Process>

The nugget forming process S2 is to fully cause the work-piece W to be electrically conducted at a predetermined current value while applying the welding pressure to the work-piece W through the electrodes 2, 3, and 3.

With reference to FIG. 3, the nugget forming process S2 is indicated by an interval (c) where the predetermined welding pressure F is applied to the work-piece W and the work-piece W is electrically conducted at the current value A2 (the predetermined current value).

The welding electrode 2, the grounding electrodes 3, 3, and the work-pieces W1 and W2 further generate heats through the nugget forming process S2. Next, as shown in FIG. 2C, the temperatures of the work-pieces W1 and W2 located under the welding electrode 2 in the work-piece W become remarkably high. As a result, diffusion of metallic atoms occurs between the work-piece W1 and the work-piece W2, and a nugget is formed at such a location.

Note that the "predetermined current value" is a current value produced by the nugget between the work-piece W1 and the work-piece W2 by allowing a current with the predetermined current value to flow between the welding electrode 2 and the grounding electrodes 3, 3, and can be set accordingly depending on the materials of the electrodes 2, 3 and 3, and the work-pieces W1 and W2, a contact area of the electrodes 2, 3 and 3 with the work-piece W1, and a time for electrical conduction, etc.

<Slow-Cooling Process>

The slow-cooling process S3 is executed after the nugget forming process S2, and is to perform electrical conduction at a lower current value than the current value when the work-piece W is fully electrically conducted (the predetermined current value in the nugget forming process S2) while applying pressure from one side to the work-piece W through the electrodes 2, 3 and 3.

With reference to FIG. 3, the slow-cooling process S3 is indicated by an interval (d) where electrical conduction is carried out at a smaller current value A3 than the current value A2 of the full electrical conduction while the predetermined welding pressure F is being applied to the work-piece W. The current value A3 can be larger or smaller than the current value A1 of the pre-electrical-conduction process S1 as long as it is smaller than the current value A2 of the full electrical conduction.

The current value A3 is not limited to any particular value as long as it is smaller than the current value A2, but it is preferable that the current value A3 should be 1/1.25 to 1/3 of the current value A2. When the current value A3 is set within such a range, it becomes possible to perform welding appropriately while accomplishing an advantage of suppressing a formation of blow holes.

The formed nugget can be slowly cooled while being pushed down through the slow-cooling process S3 (see FIG. 2D). Accordingly, a formation of gas pockets that are to be formed in the nugget (or around the nugget) in nature can be suppressed, thereby suppressing a formation of blow holes.

<Slow-Cooling Process (Welding Pressure)>

The welding pressure to the work-piece W from the welding electrode 2 in the slow-cooling process S3 is preferably set to be lower than the welding pressure to the work-piece W from the welding electrode 2 in the nugget forming process S2.

The welding pressure will now be explained with reference to FIG. 6B. The welding pressure is reduced from the predetermined welding pressure F in the nugget forming process S2 to a welding pressure F1 lower than the welding pressure F through a predetermined time, and the welding pressure F1 is maintained until at least the slow-cooling process S3 completes. The predetermined time is not limited to any particular time, but it is preferable that such a predetermined time should be short as much as possible in order to suppress excessive subduction of the welding electrode 2 to the work-piece W. For example, such a predetermined time is set to be equal to or shorter than 0.5 seconds.

The welding pressure F1 (the welding pressure in the slow-cooling process S3) is not limited to any particular pressure as long as it is smaller than the welding pressure F (the welding pressure in the nugget forming process S2). However, it is preferable that the welding pressure F1 should be 1/1.1 to 1/3 of the welding pressure F. When the welding pressure F1 is set to be within such a range, it becomes possible to prevent the welding electrode 2 from excessively subducting into the work-piece W while accomplishing the advantage of suppressing a formation of blow holes.

Figure 6A:
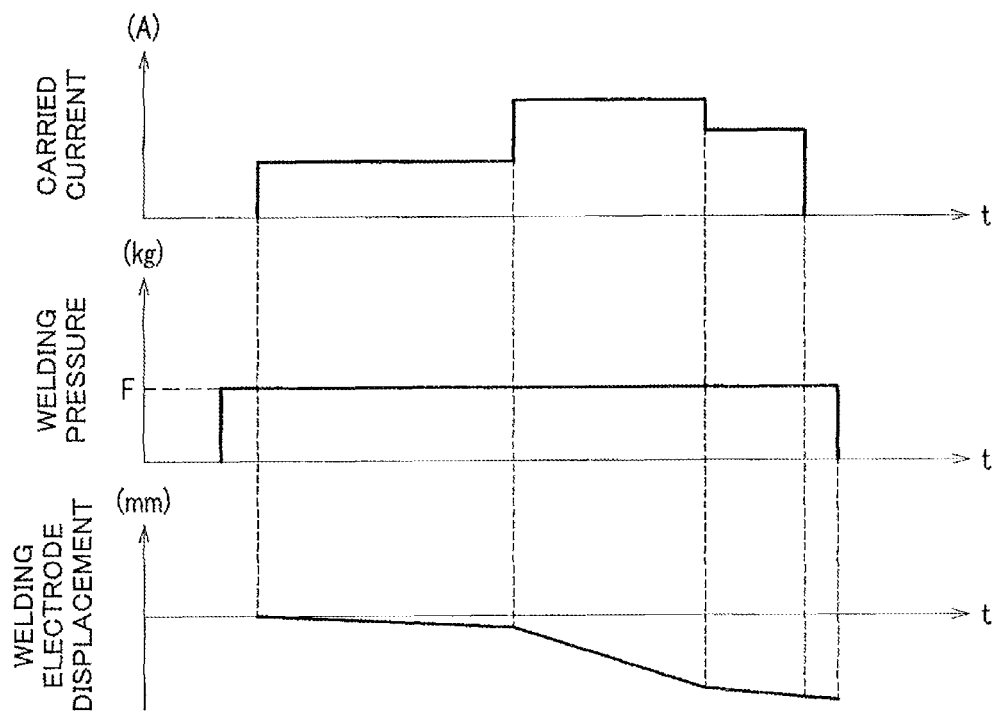
Figure 7A:
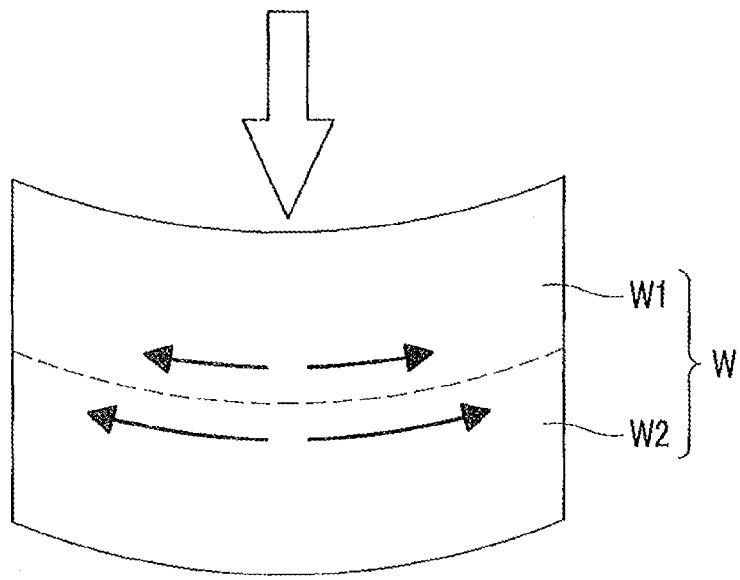
FIGS. 7A and 7B are cross-sectional views showing a condition of a work-piece when welded by the one-side spot welding method according to another embodiment of the present invention, in which FIG. 7A corresponds to FIG. 6A and is a cross-sectional view when the welding pressure is constant, and FIG. 7B corresponds to FIG. 6B and is a cross-sectional view when the welding pressure in the slow-cooling process is reduced.

When the welding pressure in the slow-cooling process S3 is not controlled, as shown in FIG. 6A, since the welding pressure in the slow-cooling process S3 is large (F), the displacement of the welding electrode (the subducting level with reference to the surface of the work-piece W1 at the time of the start of welding) becomes large during the slow-cooling process S3. That is, it becomes clear that the welding electrode 2 is subducting into the work-piece W. As a result, as shown in FIG. 7A, large stress is produced at a boundary face between the work-piece W1 and the work-piece W2. Hence, the boundary face between the work-piece W1 and the work-piece W2 is displaced, resulting in a reduction of the joining strength.

Figure 6B:
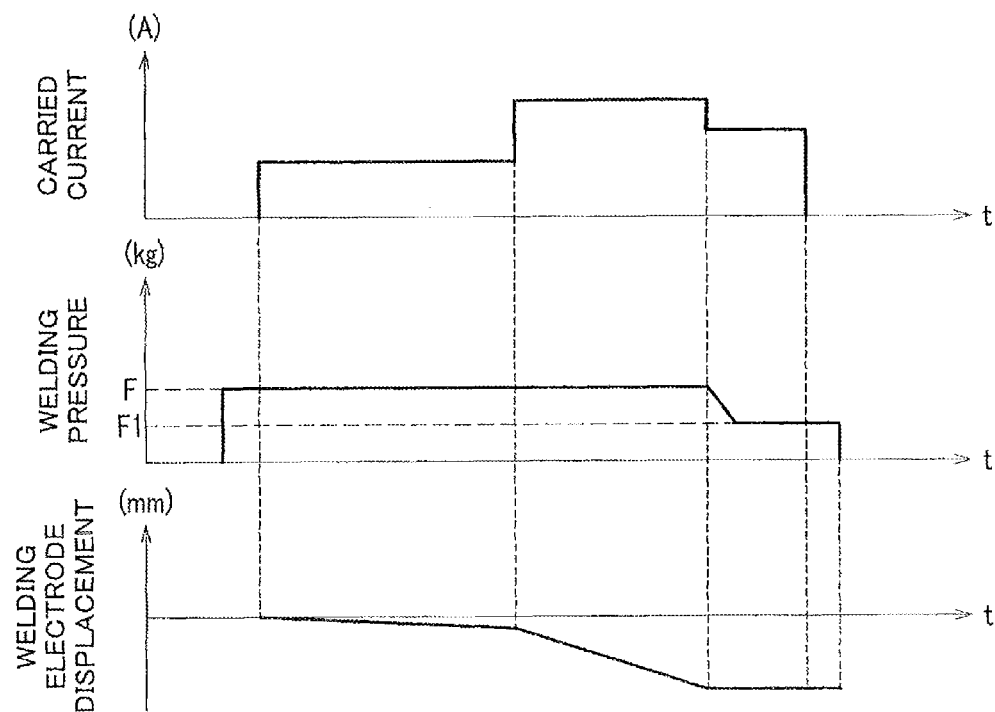
Figure 7B:
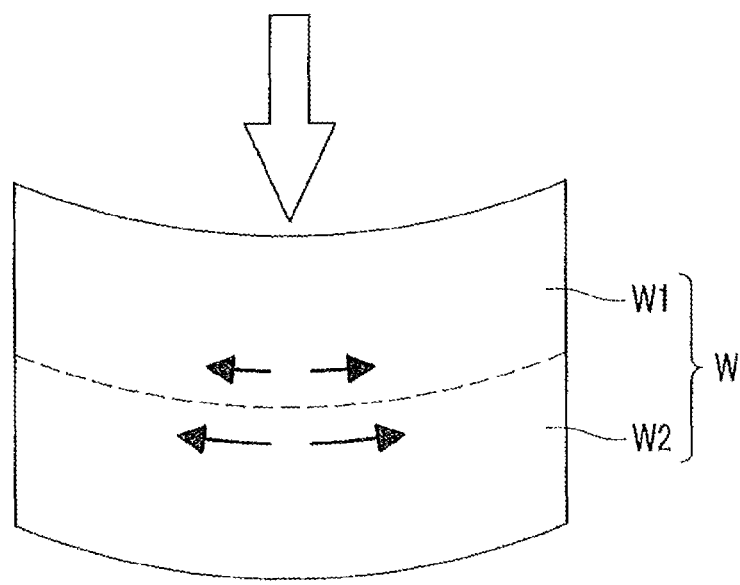

In contrast, when the welding pressure in the slow-cooling process S3 is controlled, as shown in FIG. 6B, since the welding pressure in the slow-cooling process S3 is small (F1), it becomes clear that the displacement of the welding electrode 2 hardly changes during the slow-cooling process S3, i.e., the welding electrode 2 does not subduct into the work-piece W. As a result, as shown in FIG. 7B, stress is hardly produced at the boundary face between the work-piece W1 and the work-piece W2. Hence, it becomes possible to avoid the reduction of the joining strength due to the displacement of the boundary face between the work-piece W1 and the work-piece W2.

Next, an explanation will be given of the detail of a driving method of the one-side spot welding apparatus 10 when the one-side spot welding method is executed.

<<Detail of Driving Method of One-Side Spot Welding Apparatus in One-Side Spot Welding Method>>

First of all, as an initial condition prior to the start of welding, the welding gun 1 of the one-side spot welding apparatus 10 is placed above the work-piece W by, for example, a robot arm (see FIG. 2A). In this condition, no current and pressure are applied to the work-piece W (see FIG. 3, interval (a)).

When a signal instructing the start of welding is input into the control mechanism 7, the control mechanism 7 outputs a signal instructing a downward movement to the pressure mechanism 6.

A trigger for the control mechanism 7 to output the signal instructing a downward movement may be an operation given by the operator to input the welding start signal through the input/output interfaces of the control mechanism 7, or may be based on the time table stored in the HDD, etc., of the control mechanism 7.

Upon inputting of the downward movement signal, the pressure mechanism 6 drives the welding gun 1 in the downward direction. Next, the electrodes 2, 3, and 3 of the welding gun 1 apply the welding pressure F (e.g., 50 to 200 kgf) to the surface of the work-piece W.

After the pressing by the electrodes 2, 3, and 3 is started and the welding pressure becomes stable, the control mechanism 7 outputs an A1 current signal to the power supply so as to cause the work-piece W to be electrically conducted by a current with the current value A1 (e.g., 5.0 kA).

A trigger for the control mechanism 7 to output the A1 current signal may be an advance of a time after a predetermined time from the start of pressing, or may be based on a signal additionally input from welding pressure measuring means (unillustrated).

Upon inputting of the A1 current signal to the power supply, the power supply causes a current with a current value A1 to flow through the electrodes 2, 3, and 3 of the welding gun 1 (see FIG. 2B and FIG. 3, interval (b)).

Next, based on the time table stored in the HDD, etc., of the control mechanism 7, after a predetermined time (e.g., 24 cycles) has elapsed, the control mechanism 7 outputs an A2 current signal to the power supply so as to cause the work-piece W to be electrically conducted by a current with the current value A2 (e.g., 6.0 kA).

Upon inputting of the A2 current signal to the power supply, the power supply causes a current with the current value A2 to flow through the electrodes 2, 3, and 3 of the welding gun 1 (see FIG. 2C and FIG. 3, interval (c)).

Next, based on the time table stored in the HDD, etc., of the control mechanism 7, after a predetermined time (e.g., 8 cycles) has elapsed, the control mechanism 7 outputs an A3 current signal to the power supply so as to cause the work-piece W to be electrically conducted by a current with the current value A3 (e.g., 5.5 kA).

Upon inputting of the A3 current signal to the power supply, the power supply causes a current with the current value A3 to flow through the electrodes 2, 3, and 3 of the welding gun 1 (see FIG. 2D and FIG. 3, interval (d)).

Thereafter, based on the time table stored in the HDD, etc., of the control mechanism 7, after a predetermined time (e.g., 6 cycles) has elapsed, the control mechanism 7 outputs a current cut-off signal to the power supply, and outputs a signal instructing an upward movement to the pressure mechanism 6. Upon inputting of the current cut-off signal to the power supply, the power supply terminates the current flow, and upon inputting of the upward movement signal to the pressure mechanism 6, the pressure mechanism 6 moves the welding gun 1 in the upward direction, and thus the electrodes 2, 3, and 3 of the welding gun 1 become not to apply the welding pressure to the surface of the work-piece W (see FIG. 2E, and FIG. 3, interval (e)).

A configuration may be further employed in which the welding pressure is measured through the welding pressure measuring means (unillustrated) and the pressure mechanism 6 is controlled based on a measured value input as needed to the control mechanism 7 in such a way that the welding pressure to the work-piece W from the electrodes 2, 3, and 3 becomes constant.

<When Changing Welding Pressure>

When the welding pressure is changed in the slow-cooling process S3, the control mechanism 7 outputs a locking signal to a mechanism (unillustrated) that controls an actuation of the latching members 8b simultaneously with (or substantially simultaneously with) an output of the A3 current signal to the power supply. As explained above, upon inputting of the A3 current signal to the power supply, the power supply causes the current with the current value A3 to flow through the electrodes 2, 3, and 3 of the welding gun 1 (see FIG. 2D and FIG. 3, interval (d)), and the mechanism that controls the actuation of the latching members 8b inserts the latching members 8b into the latching opening 8a. That is, the latching members 8b of the locking mechanism 8 in a condition not fitted in the latching opening 8a becomes a condition fitted in the latching opening 8a (see FIG. 5B).

When the latching members 8b are inserted in the latching opening 8a, the position of the tip of the welding electrode 2 is fixed with respect to the positions of the tips of the grounding electrodes 3, 3. This will be explained in more detail below.

Since the portions of the work-piece W where the grounding electrodes 3, 3 abut are not softened well, the grounding electrodes 3, 3 do not largely subduct into the work-piece W. That is, at the time of welding, the grounding electrodes 3, 3 are fixed (positioned) relative to the work-piece W. Moreover, when the latching members 8b are inserted in the latching opening 8a, the welding electrode 2 is fixed in the vertical direction with respect to the grounding electrodes 3, 3 (and the grounding-electrode supporting member 5). As a result, the position of the tip of the welding electrode 2 is fixed with respect to the positions of the tips of the grounding electrodes 3, 3. Hence, even if the work-piece W (the portion where the welding electrode 2 abuts) is softened, it becomes possible to avoid a case in which the tip of the welding electrode 2 subducts into the work-piece W. Accordingly, it becomes possible to suppress a reduction of the joining strength (an occurrence of joining failure) due to the displacement of the boundary face between the work-piece W1 and the work-piece W2.

In FIGS. 5A and 5B, the springs 4, 4 are provided between respective grounding electrodes 3, 3 and the grounding-electrode supporting member 5, but such springs 4, 4 are sufficiently compressed by the welding pressure in the nugget forming process S2. Hence, even if the welding electrode 2 and the grounding-electrode supporting member 5 are interlocked with each other by the locking mechanism 8 in the slow-cooling process S3, the springs 4, 4 are not compressed further largely from this condition. Moreover, the grounding electrodes 3, 3 (and the grounding-electrode supporting member 5) are pushed down by the pressure mechanism 6 from respective upper portions in the nugget forming process S2, and thus the springs 4, 4 do not expand largely. That is, even if the springs 4, 4 are provided between respective grounding electrodes 3, 3 and the grounding-electrode supporting member 5, in the slow-cooling process S3, the grounding-electrode supporting member 5 is fixed (positioned) in the vertical direction with respect to the grounding electrodes 3, 3. Hence, as shown in FIGS. 5A and 5B, even if the springs 4, 4 are provided, when the welding electrode 2 and the grounding-electrode supporting member 5 are interlocked with each other by the locking mechanism 8, the position of the tip of the welding electrode 2 is fixed with respect to the positions of respective tips of the grounding electrodes 3, 3.

Moreover, when the latching members 8b are inserted in the latching opening 8a, the pressure applied to the welding electrode 2 from the pressure mechanism 6 is distributed to the grounding electrodes 3, 3 (or the grounding-electrode supporting member 5), and thus the welding pressure to the work-piece W from the welding electrode 2 is reduced. Hence, it becomes possible to avoid a case in which the tip of the welding electrode 2 subducts in the work-piece W (the portion where the welding electrode 2 abuts) even if the work-piece W is softened.

With respect to the welding pressure change, in addition to the above-explained configuration, for example, a sensor like an optical sensor may be provided in (or near) the latching member 8b, and the latching members 8b may be inserted in the latching opening 8a at a timing at which the sensor is located at a position facing the latching opening 8a (i.e., a timing at which the latching member 8b and the latching opening 8a are positioned so as to face with each other).

Moreover, the subducting level of the welding electrode 2 relative to the work-piece W may be measured through a sensor, and the latching members 8b may be inserted in the latching opening 8a at a timing at which the measured subducting level becomes a predetermined level.

Furthermore, the control mechanism 7 may output an F1 welding pressure signal to the pressure mechanism 6 simultaneously (or substantially simultaneously) with an outputting of the A3 current signal to the power supply, and upon inputting of the F1 welding pressure signal to the pressure mechanism 6, the pressure mechanism 6 may move the welding gun 1 slightly upwardly so that the welding pressure to the surface of the work-piece W from the welding electrode 2 becomes F1. In this case, the locking mechanism 8 becomes unnecessary.

Although the one-side spot welding method and the one-side spot welding apparatus 10 have been explained, the present invention is not limited to the above-explained configuration, and can be changed and modified in design as follows for example without departing from the scope and spirit of the present invention set forth in appended claims.

Respective shapes of the welding electrode 2 and the grounding electrodes 3, 3 of the one-side spot welding apparatus 10 are not limited to any particular shapes, but in order to intensively form the nugget in the work-piece W present downwardly of the welding electrode 2, the tip of the welding electrode 2 may be in a shape that reduces the contact area of the welding electrode 2 with the work-piece W1 (e.g., a hemi-spherical shape shown in FIG. 1) and respective tips of the grounding electrodes 3, 3 may be in a shape that increases the contact area of each grounding electrode 3 with the work-piece W1 (e.g., a columnar shape that permits a plane-to-plane contact with the work-piece W1). According to such a configuration, the current is concentrated in the portion of the work-piece W downwardly of the welding electrode 2 (i.e., the current density is increased). This facilitates formation of the nugget.

The explanation was given of the case in which the welding gun 1 of the one-side spot welding apparatus 10 has two grounding electrodes 3, but the welding gun 1 may have equal to or greater than three grounding electrodes 3. When the welding gun 1 has equal to or greater than three grounding electrodes 3, like the case in which the welding gun 1 has the two grounding electrodes 3, the grounding electrodes 3 may be placed so as to be symmetrical with respect to the welding electrode 2. In other words, the grounding electrodes 3 of equal to or greater than three may be placed over a circumference around the welding electrode 2 at an equal interval.

Moreover, the explanation was given of the case in which the welding gun 1 of the one-side spot welding apparatus 10 has the springs 4, 4, and the grounding-electrode supporting member 5, but those components are not essential, and conventionally well-known configuration other than the welding electrode 2 and the grounding electrodes 3, 3 may be employed.

The explanation was given of the case in which the welding gun 1 is moved by the pressure mechanism and the welding pressure is applied to the work-piece W. However, a mechanism may be further provided which moves the work-piece W in a direction in which the welding gun 1 is placed (upward direction) to assist the application of the welding pressure.

The explanation was given of the case in which the one-side spot welding method is executed using the one-side spot welding apparatus 10 having the two grounding electrodes 3, but the one-side spot welding method can be carried out using other devices than the one-side spot welding apparatus 10. For example, a one-side spot welding apparatus having only one grounding electrode may be used.

The locking mechanism 8 is not limited to the mechanism shown in FIG. 5, and when, for example, an elastic member like a rubber is provided at the tip of the latching member 8b in a bar shape, the welding electrode 2 (or the welding-electrode supporting member) and the grounding electrodes 3, 3 (or the grounding-electrode supporting member 5) can be interlocked (fixed) with each other even if there is no latching opening 8a.

The explanation was given of the case in which the welding pressure is always constant (the welding pressure F) in welding and the welding pressure is changed (to the welding pressure F1) in the slow-cooling process S3, but the welding pressure in the pre-electrical-conduction process S1 may be changed appropriately based on the current value of the carried current and the electrical-conduction time, etc.

What is claimed is:

1. A one-side spot welding method for causing electrodes to contact a welding portion of a work-piece only from one side of the work-piece to weld the work-piece, the method comprising:

performing a nugget forming process that causes the work-piece to be fully electrically conducted at a predetermined current value while applying welding pressure to the work-piece by the electrodes from the one side; and performing a slow-cooling process that causes the work-piece to be electrically conducted at a current value lower than the predetermined current value after the nugget forming process while applying welding pressure to the work-piece by the electrodes from the one side, wherein the electrodes include a welding electrode and one or more grounding electrodes, and wherein the one-side spot welding method further comprises using a locking mechanism to join the welding electrode to the one or more grounding electrodes for regulating relative vertical positions of the welding electrode and the one or more grounding electrodes in such a way that in the joined condition a welding pressure from the welding electrode to the work-piece in the slow-cooling process is lower than a welding pressure from the welding electrode to the work-piece in the nugget forming process, and wherein the locking mechanism includes a latch opening that is provided in an outer circumference surface of the welding electrode, and a latching member that is provided in the grounding-electrode supporting member so as to face the latch opening and is moved, so as to be inserted into the latching opening, in a direction perpendicular to a direction of the working-piece being pressed.

2. The one-side spot welding method according to claim 1, further comprising performing a pre-electrical-conduction process of applying welding pressure to the work-piece through the electrodes from the one side and provisionally causing the work-piece to be electrically conducted at a current value lower than the predetermined current value.

* * * * *